United States Patent [19]
Jollie

[11] 3,943,797
[45] Mar. 16, 1976

[54] BICYCLE PEDAL
[75] Inventor: Henry D. Jollie, Clifton, N.J.
[73] Assignee: Lawrence Pesak Associates, Inc., New York, N.Y. ; a part interest
[22] Filed: Nov. 4, 1974
[21] Appl. No.: 520,253

[52] U.S. Cl. .............................. 74/594.4; 280/231
[51] Int. Cl.² .......................................... B62M 3/08
[58] Field of Search ............ 74/594.4, 594.5, 594.6, 74/594.7; 280/231, 273

[56] References Cited
UNITED STATES PATENTS

| | | | |
|---|---|---|---|
| 592,549 | 10/1897 | Lincoln | 74/594.4 |
| 709,306 | 9/1902 | Decuir | 74/594.4 |
| 2,361,708 | 10/1944 | Raba et al. | 74/594.4 |
| 2,399,888 | 5/1946 | Persons | 74/594.4 |

FOREIGN PATENTS OR APPLICATIONS

| | | | |
|---|---|---|---|
| 620,017 | 3/1949 | United Kingdom | 74/594.4 |
| 693,377 | 7/1953 | United Kingdom | 74/594.4 |

*Primary Examiner*—Samuel Scott
*Assistant Examiner*—F. D. Shoemaker
*Attorney, Agent, or Firm*—Jack D. Sloblod

[57] ABSTRACT

A pedal for a bicycle which permits two people who are seated in close tandem relation to pedal the bicycle using a single crank and sprocket assembly. The pedal normally has an elongated shaft carried at one end by the crank and normally will have three arms extending radially at axially spaced points along the elongated shaft. The arms are angularly aligned about the elongated shaft and connected by tread surfaces.

3 Claims, 4 Drawing Figures

BICYCLE PEDAL

BACKGROUND OF THE INVENTION

The invention relates to bicycles having two seats in closely spaced tandem relationship and particularly to apparatus for permitting each of the riders to contribute pedalling action to a conventional chain and sprocket drive.

The prior art includes various means by which two people may be seated on a bicycle. Most commonly a package rack disposed over the rear wheel is utilized as a second seat. Less common but also relevant is the apparatus shown in Ridgway, U.S. Pat. No. 2,715,342 issued Aug. 16, 1955. That patent shows a journal clamp on the support for the primary seat which carries a generally horizontal bar to support a second seat. The prior art includes various apparatus which is that shown in Sykes, et al, U.S. Pat. No. 3,307,425 issued Mar. 7, 1967 which provides an axial extension to a conventional pedal. In this form of the apparatus one rider positions his feet on the inboard portion of each pedal and the other rider positions his feet on the outboard portion of each pedal. Such apparatus has not been widely accepted because it is relatively cumbersome to use. Another apparatus having some similarity is shown in Lofquist, et al, U.S. Pat. No. 1,977,235 issued Oct. 16, 1934. That apparatus uses two pedals joined on a bar which is carried by the crank of the bicycle. The pedals are joined by the spring. Such apparatus has not been widely accepted because of its relative complexity.

Accordingly it is a primary object of the invention to provide apparatus which will enable a second bicycle rider to contribute a portion of the power to pedal a bicycle and which will be simple to use as well as to manufacture.

It is still another object of the invention to provide apparatus which will be functionally satisfactory so that it will be widely accepted in facilitating the sale of relatively inexpensive bicycles having the capabilities of so-called "bicycles built for two" at a greatly reduced cost.

SUMMARY OF THE INVENTION

In accordance with one form of the invention a pedal which comprises an elongated shaft having one end engaging the crank of a bicycle sprocket and chain drive assembly. The elongated shaft has at least two arms extending radially from at least two axially spaced points. The arms are angularly spaced about the axis of the elongated shaft at identical positions and have connecting between them treads for a rider's feet.

Preferably there will be three arms and they will extend from each of two points at angular increments of 120°. The treads may be belted or staked on the arms in a manner which permits rotation about the axis thereof.

BRIEF DESCRIPTION OF THE DRAWING

While the specification concludes with claims particularly pointing out and distinctly claiming the subject matter which I regard as my invention, it is believed the invention will be better understood from the following description taken in conjunction with the accompanying drawing which:

DESCRIPTION OF A PREFERRED EMBODIMENT

Figure 1:
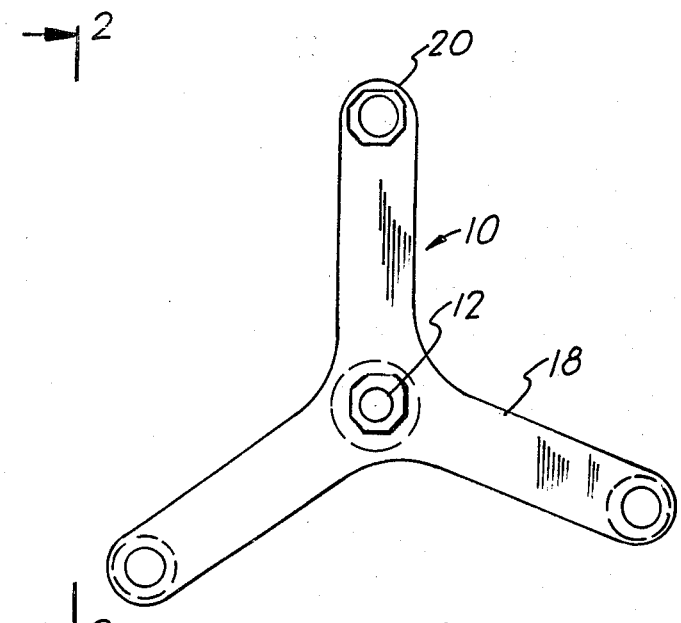
FIG. 1 is a side elevational view of the pedal in accordance with the invention.
Figure 2:
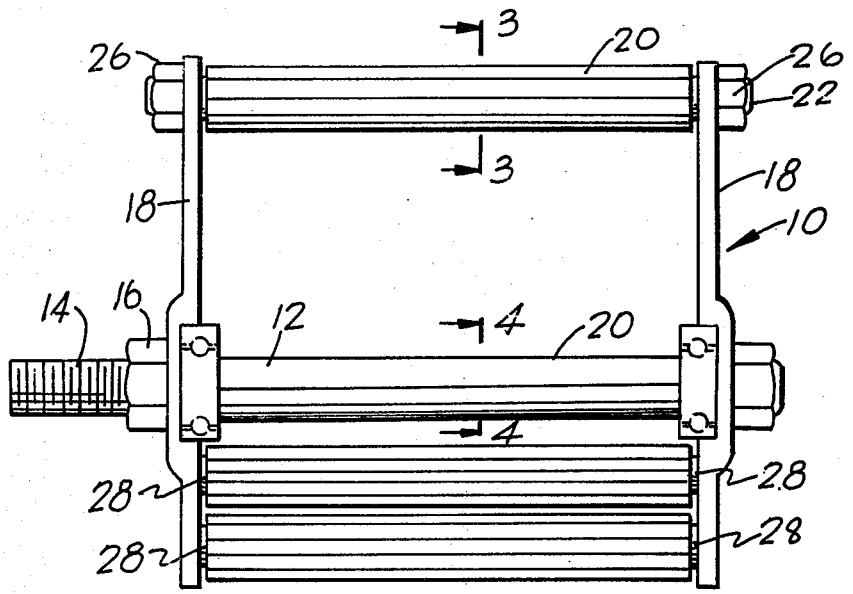
FIG. 2 is a front elevational view of the apparatus shown in FIG. 1.
Figure 3:
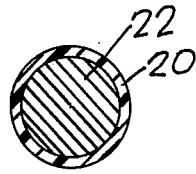
FIG. 3 is a sectional view taken through the line 3—3 of FIG. 2.
Figure 4:
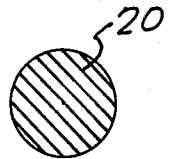
FIG. 4 is a sectional view taken through the line 4—4 of FIG. 2.

Referring now to FIGS. 1 and 2 there is shown a pedal 10 in accordance with the invention. An elongated shaft 12 has threads 14 disposed at one end thereof together with a locking nut 16 for engagement with a crank (not shown) of a conventional pedal and sprocket drive apparatus of the bicycle (not shown). Carried at axially spaced points on the elongated shaft 12 are arm assemblies 18. Each arm assembly 18 has in the embodiment illustrated three arms spaced at 120° increments which extend radially at equal distance. The arm assemblies are free to rotate about the elongated axis 12. The arm assemblies 18 are disposed in phased relationship about elongated axis 12 so that the angular orientation is the same for each. Carried between each arm is a tread 20 which is concentric with a shaft 22 as is best seen in FIG. 3. The shaft 22 normally will be steel and the tread 20 will be normally rubber. The exact manner of fixing the ends of the shaft 22 to the arm assembly 18 may vary without departing from the spirit of the invention and may include nuts 26 or staked connections 28. All or both forms are shown in FIGS. 1 and 2 although normally all the connections for the shafts 22 will be the same and the representation in the figures is merely to illustrate the alternate forms of connection. Referring to FIG. 4 there is shown a cross section of the elongated shaft 20 which normally will be made of steel. Although other metals may also be used to reduce the weight of the assembly. Various other changes may be made in the apparatus without departing from the spirit of the invention and it will be understood that those skilled in the art that the apparatus may be utilized with conventional single speed bicycles, three speed bicycles and even ten speed bicycles.

The apparatus provided avoids the problem of merely letting the second rider's feet dangle uselessly or attempting to place his feet on top of the feet of the first rider. In addition the bicycle in accordance with the invention will accommodate two cyclists but is far less bulky to store and is much lighter in weight than the conventional bicycle built for two. In operation one cyclist will place his feet across two of the three pedals 20. This will maintain the orientation of the third pedal 20 and permit the two cyclists to simultaneously pedal with their legs in a "nested" relationship.

Having thus described the invention, what I claim as new is:

1. A pedal for a bicycle for two operators comprising: an elongated shaft configured for engaging at one end of the crank of a drive mechanism of said bicycle; a pair of generally planar members extending radially respectively from two axially spaced points along said shaft; each of said members having three angularly spaced apart elongated arms radiating from said shaft; the respective arms of the pair of members being axially aligned; three generally cylindrical tread members axially directed respectively between the free ends of said aligned arms, said arms being of sufficient length to enable the toe of the foot of one of the operators to be inserted radially between one of the treads and the shaft as a stirrup so that said pedal may be simultaneously engaged by a leg of each of the operators in nested relationship, one over the other.

2. The pedal of claim 1 wherein said arms of each of said planar members are spaced apart at 120° increments.

3. The pedal of claim 2 wherein each of said treads is tubular, having a central bore, and rod means extending through said central bore and secured at its opposite ends to said opposed arms.

* * * * *